United States Patent [19]

Kay et al.

[11] 4,315,382

[45] Feb. 16, 1982

[54] PLANT CONTAINER

[75] Inventors: Arthur H. Kay, Schaumburg; Ted Dziewulski, Rosemont, both of Ill.

[73] Assignee: Phillips Petroleum Co., Bartlesville, Okla.

[21] Appl. No.: 97,247

[22] Filed: Nov. 26, 1979
(Under 37 CFR 1.47)

[51] Int. Cl.$^3$ ............................................. A01G 9/02
[52] U.S. Cl. ........................................... 47/66; 47/71
[58] Field of Search ................... 47/66, 71, 79, 80, 81; 220/69, 85 H; 229/1.5 H; 206/499–503

[56] References Cited

U.S. PATENT DOCUMENTS

| 2,514,269 | 7/1950 | Wilberschied | 47/81 |
| 3,079,037 | 2/1963 | Schechter | 47/71 X |
| 3,107,028 | 10/1963 | De Robertis | 47/71 X |
| 3,949,524 | 4/1976 | Mickelson | 47/71 |

FOREIGN PATENT DOCUMENTS

| 289885 | 10/1965 | Australia | 47/81 |
| 615048 | 12/1948 | United Kingdom | 220/69 |

Primary Examiner—James R. Feyrer

[57] ABSTRACT

An improved container for plants or the like comprising a pot and a tray releasably securable to the bottom of the pot. The pot and tray are provided with snap lock means for connecting the pot and tray which snap lock means includes a plurality of upwardly extending tapered protuberances having undercut portions and extending upwardly from the tray, which protuberances are receivable in corresponding apertures in the bottom portion of the pot, and which snap lock means further includes a plurality of wedge-locking elements carried by the pot and tray which are positioned adjacent the protuberances and apertures.

22 Claims, 10 Drawing Figures

PLANT CONTAINER

The invention relates generally to improvements in container structure. In one aspect, the invention relates to improved plant containers, each of which includes a pot and a tray with means for removably securing the tray to the lower portion of the pot.

In the past it has been conventional practice to construct hanging or standing plant containers or flow planters from wood or metal materials with such containers so configured as to hold a plant and surrounding moist soil. Difficulties have been encountered with such conventional plant containers, which difficulties stem largely from the fact that moisture in the soil progresses to the bottom of the planter and does not evenly distribute throughout the soil or soil mixture. Some attempts have been made to avoid such problems by providing holes in the bottom of the pot portion of such a plant container and by incorporating an integrally formed tray with the pot for collecting water which has passed through the soil. Cleaning of such a pot-and-tray plant container is extremely difficult due to the unitary structure. Furthermore, in some instances, water often accumulates in the tray in sufficient quantity to overflow the edges of tray and cause damage to the supporting surface.

Another problem frequently encountered with fixed or integrally formed pot-and-tray plant containers is that water cannot be drawn from the tray back into the soil in the pot as the soil dries out at the upper levels of the plant container. This problem stems largely from the fact that the hole or holes in the bottom of the pot structure through which the moisture passes from the soil to the tray are generally raised a substantial distance from the water collection tray so that the water cannot be redrawn back into the soil from the tray.

Therefore, a need exists for the provision of a container for plants and the lift-supporting environment therefor, which container provides moisture control for the life environment soil, a structure which is easy to clean, and a structure wherein the pot and tray comprising the structure can be securely connected and, alternately, readily separated when desired.

Accordingly, to overcome the deficiencies of the prior art noted above, as well as other deficiencies of the prior art known to those skilled in the field of horticulture, the present invention contemplates a novel plant container comprising a pot, a tray, and snap lock means for releasably securing the tray to the bottom of the pot. The tray is characterized by a generally flat bottom having an annular upstanding rib formed thereon, which rib is interrupted at at least two positions. Each such interruption is defined by a pair of generally upstanding walls on the annular rib and disposed respectively on opposite sides of the interruption with each upstanding wall having a projection thereon and with the projections of each pair of upstanding walls extending toward each other from the respective upstanding walls. The pot includes a generally flat bottom with a downwardly extending annular rib thereon and at least two generally horizontal walls extending radially inwardly from the downwardly extending annular rib. Each generally horizontal wall communicates with the generally flat bottom by means of a first generally vertical wall extending upwardly from the radially innermost portion of each generally horizontal wall. A pair of generally upwardly extending second vertical walls are formed along the opposite edges of each generally horizontal wall intermediate the downwardly extending annular rib and the respective first generally vertical wall, with each upwardly extending second vertical wall having a projection thereon and with the projections of each pair of generally upwardly extending second vertical walls extending away from each other. The projections on each pair of upwardly extending second vertical walls are sized and shaped to releasably engage the projections of the corresponding pair of upstanding walls on the tray, thereby providing means for releasably connecting the pot and tray of the plant container.

In another embodiment, the tray is provided with upwardly extending protuberances positioned adjacent the interruptions and receivable within corresponding apertures in the lower portion of the pot, the protuberances and apertures providing detent means for releasably connecting the pot and tray.

An object of the invention is to provide a plant container which overcomes the deficiencies of prior plant containers of the type which comprise a pot and a tray.

Another object of the invention is to provide improved means for releasably connecting the pot and tray of a plant container.

Still another object of the invention is to provide an improved pot-and-tray plant container suitable for manufacture by molding resilient material.

Yet another object of the present invention is to provide an improved pot-and-tray plant container having improved means for interconnecting the pot and tray which is both simple and convenient to operate.

Other objects, aspects and advantages of the invention will be evident from the following detailed description when read in conjunction with the accompanying drawings in which.

Figure 1:
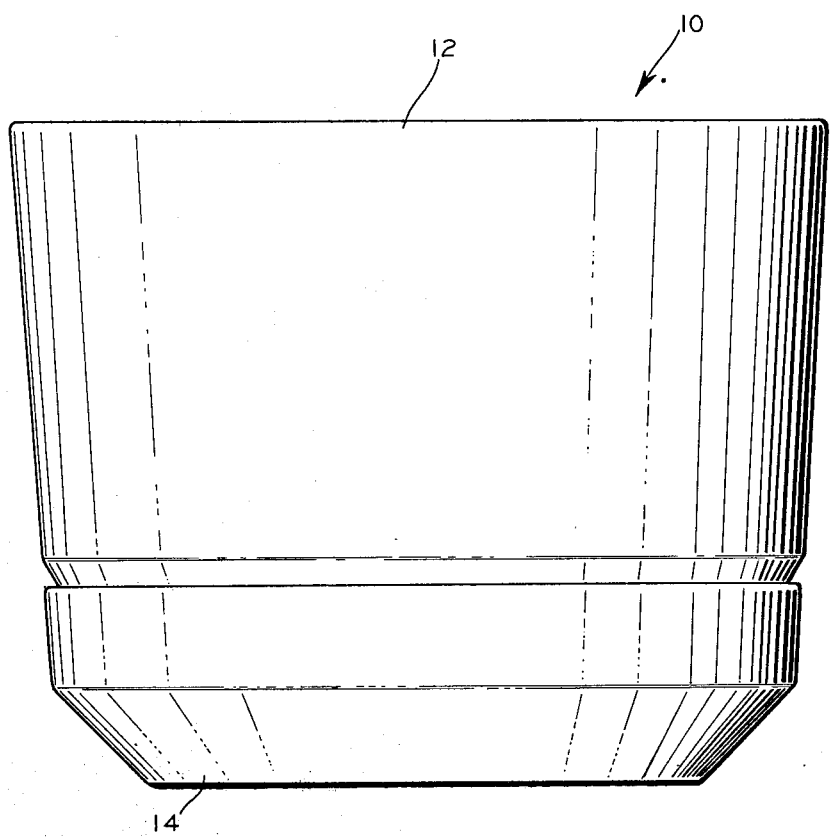
FIG. 1 is a side elevation of a pot-and-tray plant container constructed in accordance with the present invention.
Figure 2:
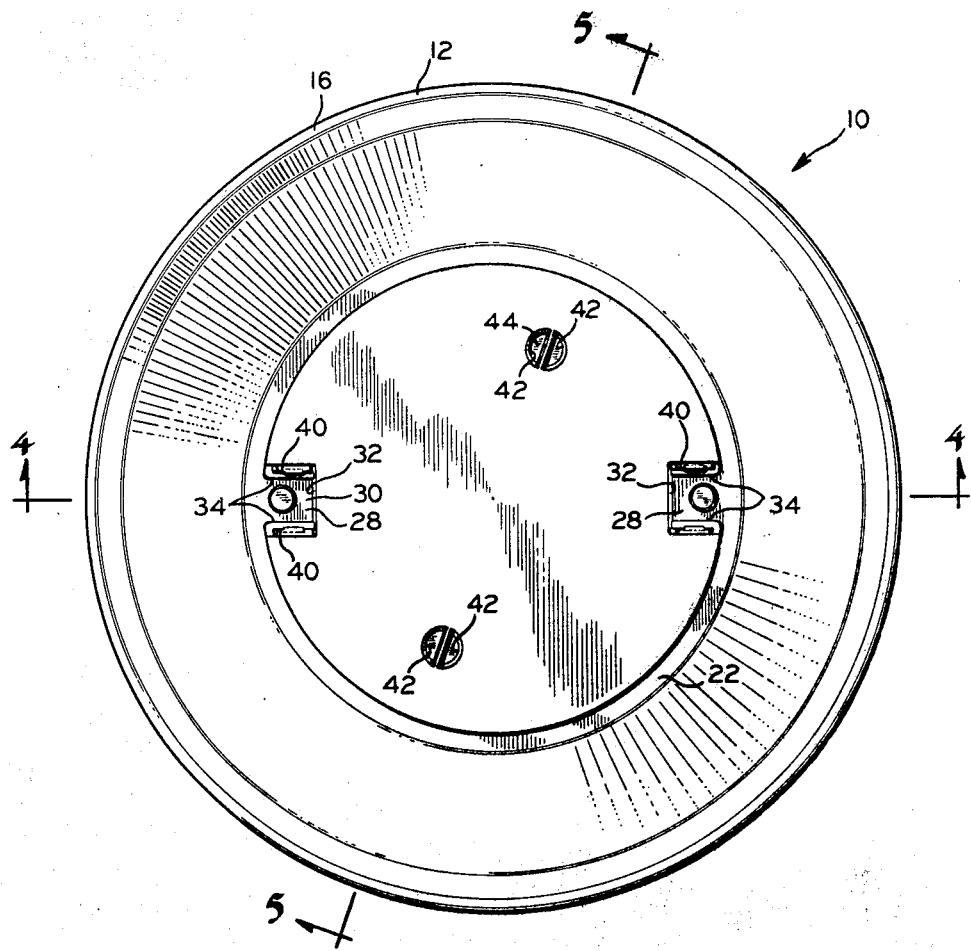
FIG. 2 is a top plan view of the plant container of FIG. 1.
Figure 3:
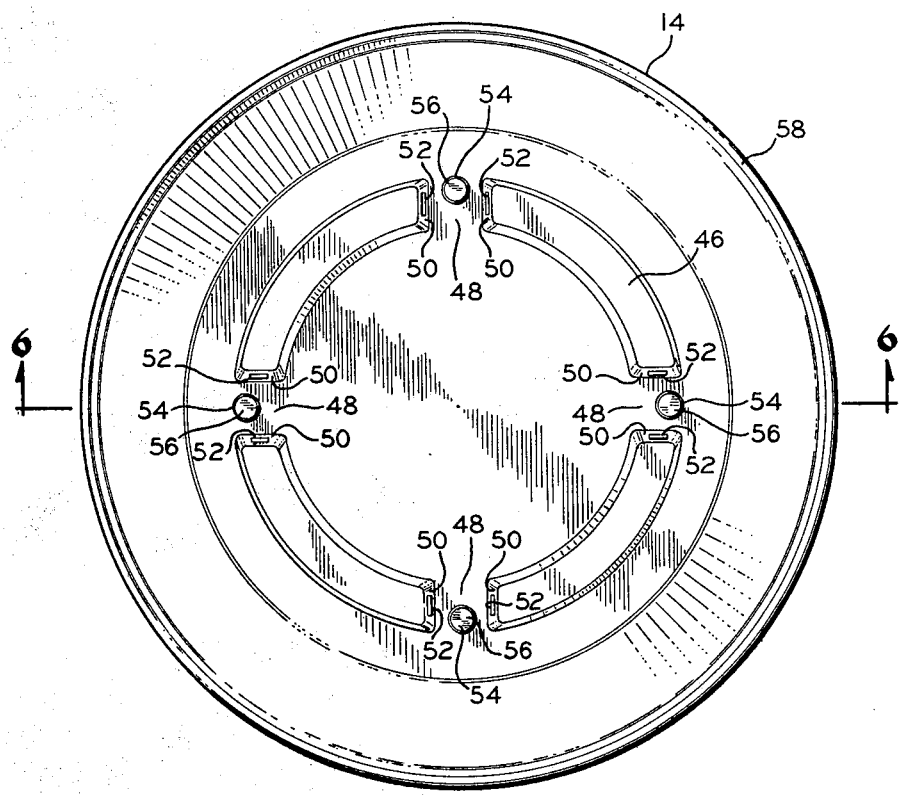
FIG. 3 is a top plan view of the tray portion of the plant container of FIG. 1 with the pot portion removed therefrom.
Figure 4:
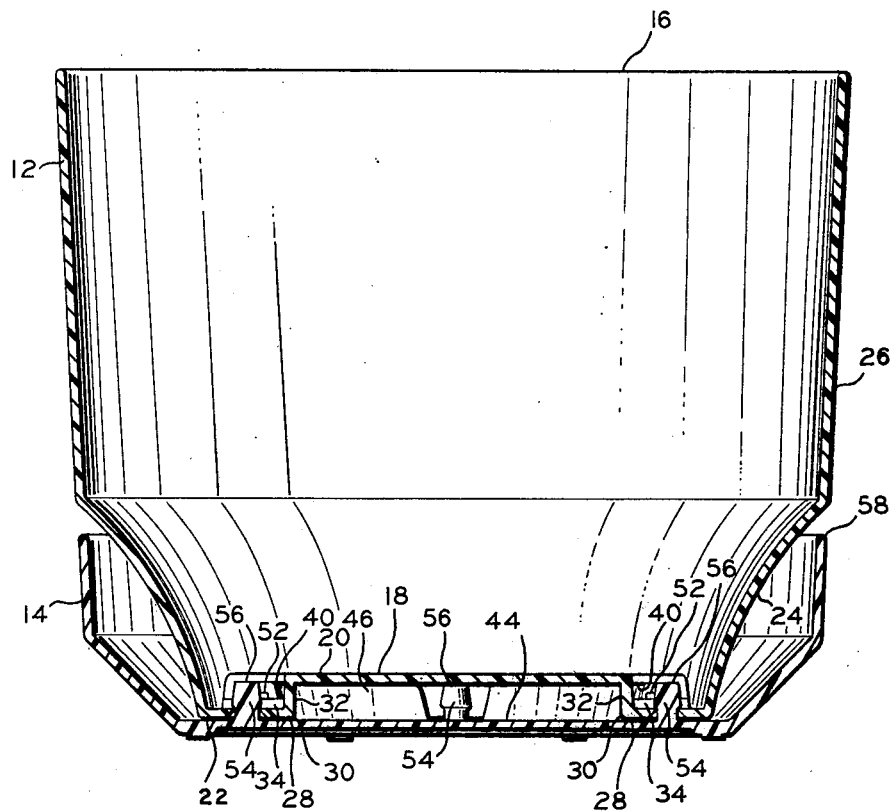
FIG. 4 is a cross-sectional view taken along line 4—4 of FIG. 2; p
Figure 5:
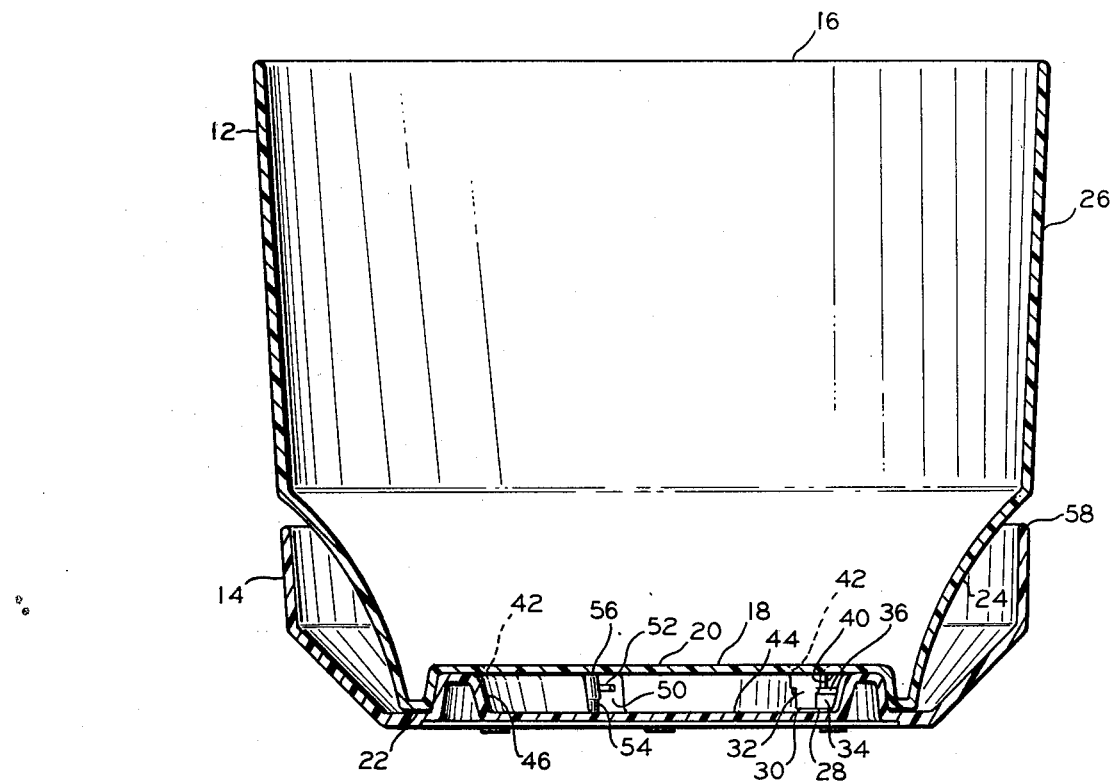
FIG. 5 is a cross-sectional view taken along line 5—5 of FIG. 2.
Figure 6:
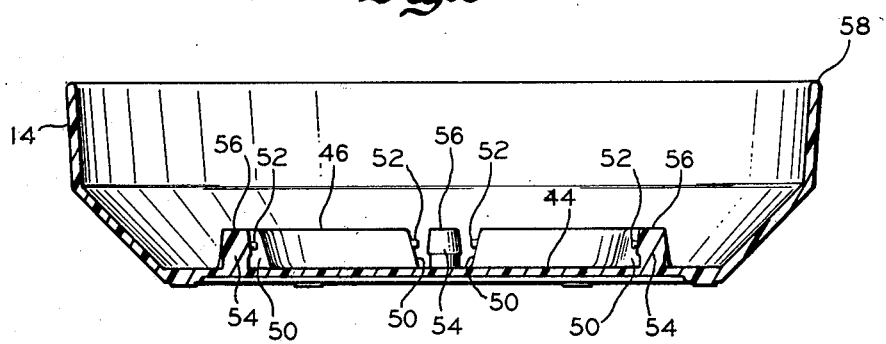
FIG. 6 is a cross-sectional view taken along line 6—6 of FIG. 3.
Figure 7:
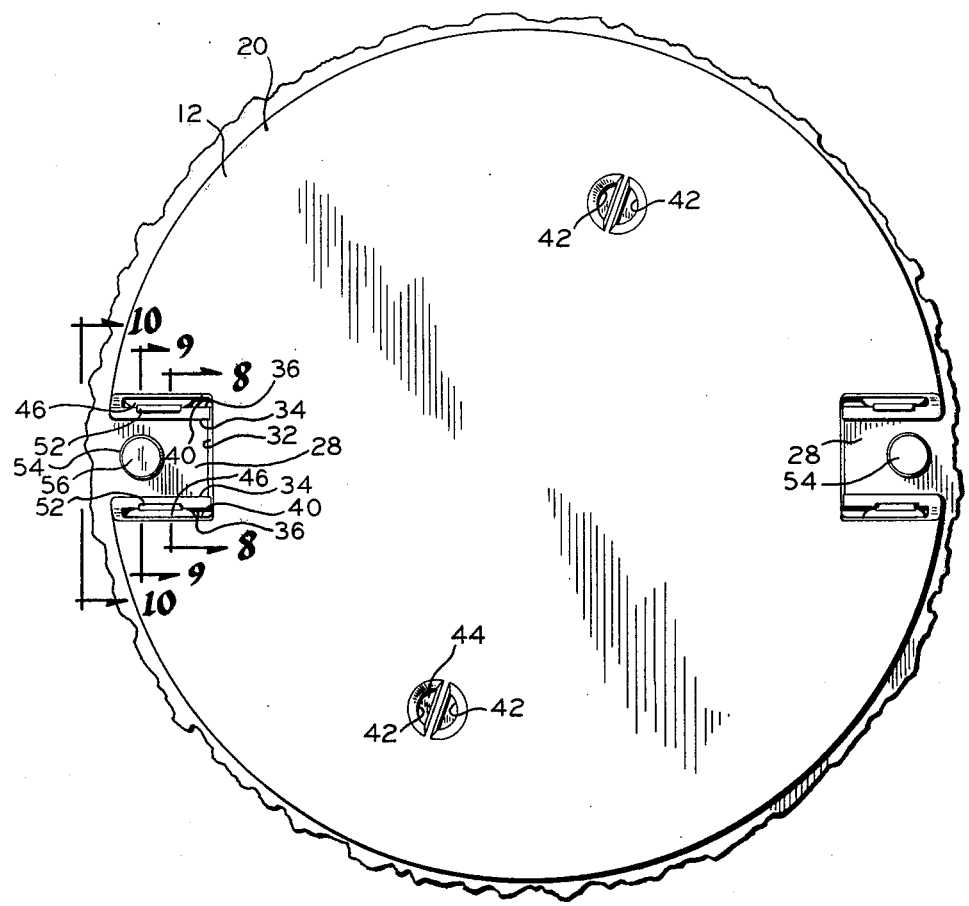
FIG. 7 is an enlarged fragmentary top plan view more clearly illustrating the details of construction of the connecting mechanism shown in FIG. 2.

Referring now to the drawings, a plant container constructed in accordance with the present invention is illustrated therein and is generally designated by the reference character 10. The plant container 10 comprises a pot 12 and a tray 14. The pot 12 has an open upper end portion 16 and a substantially closed lower end portion 18. The lower end portion 18 is characterized by a generally flat bottom portion 20 bordered by a downwardly extending annular rib 22. An upwardly and outwardly flared sidewall portion 24 extends upwardly from the annular rib 22 and communicates with a frustoconically shaped sidewall portion 26 which extends upwardly therefrom, terminating in the previously mentioned open upper end portion 16.

Two diametrically opposed, generally horizontal walls 28 extend radially inwardly from the downwardly extending annular rib 22. The inner end portion 30 of each of the horizontal walls 28 communicates with the generally flat bottom portion 20 via a respective generally vertical wall 32 which extends upwardly from the inner end portion 30 of each generally horizontal wall 28.

Figure 8:
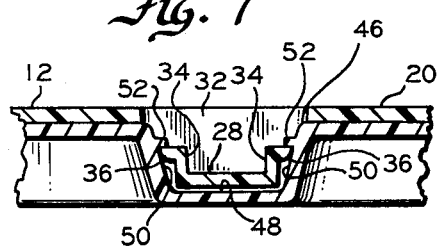
FIG. 8 is a cross-sectional view taken along line 8—8 of FIG. 7.
Figure 9:
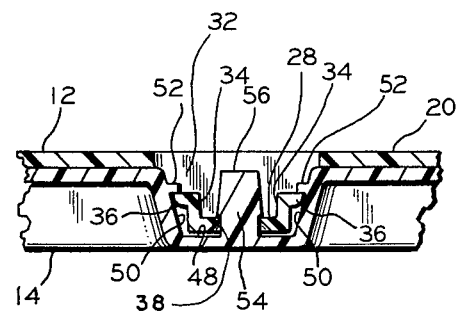
FIG. 9 is a cross-sectional view taken along line 9—9 of FIG. 7.
Figure 10:
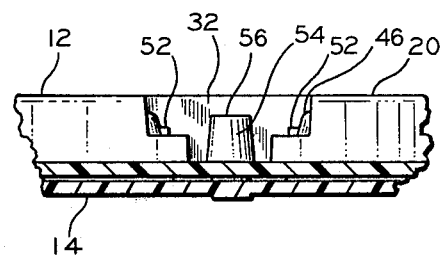
FIG. 10 is a cross-sectional view taken along line 10-19 of FIG. 7.

A pair of generally upwardly extending, substantially vertical second walls 34 extend generally radially inwardly along the opposite edges of each horizontal wall 28. Each upwardly extending second wall 34 is provided with an outwardly extending projection 36 extending along the upper margin of a respective wall 34,. As best shown in FIGS. 8 and 9, each pair of projections 36 associated with a horizontal wall 28 extend outwardly away from each other.

Each horizontal wall 28 is further provided with a generally vertically aligned aperture 38 extending therethrough. Each aperture 38 is preferably tapered with the aperture diverging downwardly as it extends through the corresponding horizontal wall 28.

It will be noted that each of the second walls 34 extends from the downwardly extending annular rib 22 to the corresponding vertical wall 32, and defines with the annular rib 22, vertical wall 32 and generally flat bottom portion 20, an aperture 40 of generally rectangular shape. The generally flat bottom portion 20 is optionally provided with one or more apertures 42 extending therethrough which provide for a desired amount of moisture passage through the bottom portion of the pot 12.

The tray 14 is provided with a generally flat bottom portion 44. An annular rib 46 extends upwardly from the bottom portion 44 and is interrupted at four equally, circumferentially spaced positions as shown at 48. Each interruption 48 in the annular rib 46 is defined by a pair of mutually facing, upstanding walls 50 of the annular rib 46 with each pair of upstanding walls 50 being disposed on opposite side of a respective interruption 48. Each of the upstanding walls 50 is further provided with a projection 52 thereon with the projections 52 of each pair of upstanding walls 50 extending toward each other from the respective upstanding walls 50.

The tray 14 is further provided with an upwardly extending, double-tapered protuberance 54 positioned within or adjacent a corresponding interruption 48 and extending upwardly from the bottom portion 44 of the tray 14. Each protuberance 54 is preferably positioned within a respective interruption 48 of the annular rib 46. Each protuberance 54 is provided with detent means in the form of a portion thereof of reduced cross-sectional area intermediate the bottom portion 44 of the tray 14 and the upper or outer end 56 of the protuberance 54 in comparison with the cross-sectional area of the protuberance 54 intermediate the detent means and the outer end 56 of the protuberance.

The pot 12 and tray 14 of the plant container 10 are releasably secured together by positioning the pot 12 with the closed lower end 18 thereof within the open upper end portion 58 of the tray 14 and with the apertures 38 of the pot 12 in registration with corresponding protuberances 54 of the tray 14. It will be noted at this time that the minimum cross-sectional area of each aperture 38 is less than the maximum cross-sectional area of each protuberance 54 intermediate the area of reduced cross-sectional area on the protuberance and the outer end 56 of the protuberance. It will also be noted that the projections 36 on the pot and the projections 52 on the tray are sized and shaped to provide an interference snap fit therebetween when the pot 12 and tray 14 are assembled together by forcing the mutually registered pot 12 and tray 14 together. Such interference fit is best illustrated in FIGS. 8 and 9. It will further be noted that each protuberance 54 provides an interference snap fit with the corresponding aperture 38 through which it extends by means of engagement of the detent means defined by the region of reduced cross-sectional area of the protuberance with the corresponding region of reduced cross-sectional area of the corresponding aperture 38, as best shown in FIG. 9.

To disassemble the interconnected pot 12 and tray 14, it is merely necessary to apply firm, but not excessive, separating force between the pot 12 and tray 14 to disengage the resilient interconnections provided by the projections 36 and 52 and by the protuberances 54 and apertures 38.

It will be noted that the upwardly extending annular rib 46 preferably extends a distance above the bottom portion 44 appreciably greater than the distance extended below the generally flat bottom portion 20 of the pot 12 by a downwardly extending annular rib 22. This height differential between the two annular ribs provides a suitable clearance between the annular rib 22 of the pot and the generally flat bottom portion 44 of the tray to permit unrestricted water flow through the tray 14 under the pot 12.

While any suitable materials can be employed for the construction of the pot 12 and tray 14 of the plant container 10, it is presently preferred that a relatively rigid material having a moderate degree of resilience be employed in the construction of the pot 12 and tray 14 to facilitate the snap-locking mechanism embodied in the invention for connecting the pot 12 and tray 14.

Suitable materials for use in this regard include moldable thermosetting and thermoplastic synthetic resinous materials. Injection moldable thermoplastic alpha olefin polymer and copolymer materials are well adapted for the construction of the pot 12 and tray 14 with polypropylene and polyethylene being especially well adapted for such purpose.

The combination of the wedging and locking action provided by the projections 52 and 36 together with the additional wedging and locking action, as well as antirotational securement provided by the protuberances 54 and apertures 38 provides a snap locking mechanism between the pot 12 and tray 14 of the plant container 10 which remains securely in place even during relatively rough handling of the interconnected pot and tray, but which can be readily disconnected by the application of only moderate force when it is desired to separate the pot and tray for cleaning purposes or other reasons.

It should be understood that the structure illustrated and described herein evidences only one embodiment of the present invention. It will be readily apparent that more or less interruptions may be employed in the upstanding annular rib of the tray 14 along with corresponding protuberances positioned therein or adjacent thereto, and corresponding additional horizontal walls and apertures can be provided in the pot 12. Similarly, it will be understood that other configurations of plant containers can employ the pot-to-tray connecting mechanism of the instant invention, such as square, rectangular, triangular or polygonal shapes. Furthermore, the annular ribs 22 and 46 need not be circular as illustrated herein, but may rather be configured in any desired shape as long as the pot and tray can be placed in registration one with the other with the various locking elements thereof in corresponding registration.

Changes can be made in the combination and arrangement of parts or elements as heretofore set forth in the specification and shown in the drawings without departing from the spirit and scope of the invention as defined in the following claims.

That which is claimed is:

1. A container for plants or the like comprising:
   a tray having a generally flat bottom portion and a rib upstanding from the bottom portion and interrupted at a plurality of positions;
   a plurality of upwardly extending protuberances extending from the bottom portion of said tray each positioned adjacent an interruption in the rib;
   a pot having a generally flat bottom portion and a downwardly extending rib extending downwardly from the bottom portion of said pot;
   a plurality of generally vertically aligned apertures in said pot each sized and shaped to receive a corresponding protuberance of said tray therethrough; and
   each upwardly extending protuberance having detent means thereon for providing an interference fit with a corresponding generally vertically aligned aperture in said pot so as to releasably connect said pot and said tray.

2. A container in accordance with claim 1 wherein the detent means on each said protuberance includes a portion of said protuberance intermediate the bottom portion of said tray and the outer end of said protuberance of reduced cross-sectional area relative to the cross-sectional area of said protuberance intermediate said portion of reduced cross-sectional area and the outer end of said protuberance; and wherein each said generally vertically aligned aperture is provided with a minimum cross-sectional area less than the cross-sectional area of each said protuberance intermediate said portion of reduced cross-sectional area and the outer end of said protuberance.

3. A container in accordance with claim 1 wherein said downwardly extending rib of said pot is generally circular, said upstanding rib of said tray is generally circular, and the minimum diameter of said downwardly extending rib is greater than the maximum diameter of said upstanding rib.

4. A container in accordance with claim 1 wherein said upstanding rib of said tray extends upwardly from the bottom portion of said tray a first distance, said downwardly extending rib of said pot extends downwardly from the bottom portion of said pot a second distance, and said first distance is greater than said second distance.

5. A container in accordance with claim 1 wherein the bottom portion of said pot is characterized further to include a plurality of apertures therethrough.

6. A container in accordance with claim 1 wherein said pot and said tray are each formed of a resilient, moldable, synthetic resinous material.

7. A container in accordance with claim 1 characterized further to include:
   a pair of upstanding walls on the rib of said tray defining an interruption at each of the positions at which the rib is interrupted, each said pair of upstanding walls being disposed respectively on opposite sides of the interruption, each said upstanding wall having a projection thereon and the projections of each said pair of upstanding walls extending toward each other from the respective upstanding walls;
   a plurality of generally horizontal walls extending horizontally inwardly from the downwardly extending rib of said pot, each said generally horizontal wall communicating at the innermost end thereof with the bottom portion of said pot via a first generally vertical wall; and
   a pair of generally upwardly extending second generally vertical walls extending generally inwardly along the opposite edges of each said generally horizontal wall intermediate the downwardly extending rib and the respective first generally vertical wall, each upwardly extending second generally vertical wall having a projection thereon with the projections of each pair of upwardly extending second generally vertical walls extending away from each other in opposite directions.

8. A container in accordance with claim 7 wherein each upwardly extending second generally vertical wall communicates between said downwardly extending rib and a respective first generally vertical wall.

9. A container in accordance with claim 8 wherein the projections on each pair of upwardly extending second generally vertical walls communicate between said downwardly extending rib and a respective first generally vertical wall.

10. A container in accordance with claim 8 wherein an opening is provided in said pot defined by each upwardly extending second generally vertical wall, the bottom portion of said pot, the downwardly extending rib of said pot, and the corresponding first generally vertical wall.

11. A container for plants or the like, comprising:
    a tray having a generally flat bottom portion and a rib upstanding from the bottom portion and interrupted at a plurality of positions;
    a pot having a generally flat bottom portion and a downwardly extending rib extending downwardly from the bottom portion of said pot;
    a pair of upstanding walls on the rib of said tray defining an interruption at each of the positions at which said rib of said tray is interrupted, each pair of upstanding walls being disposed respectively on opposite sides of the interruption, each said upstanding wall having a projection thereon and the projections of each said pair of upstanding walls extending toward each other from the respective upstanding walls;
    a plurality of generally horizontal walls extending horizontally inwardly from the downwardly extending rib of said pot, each said generally horizontal wall communicating at the innermost end thereof with the bottom portion of said pot via a first generally vertical wall; and
    a pair of generally upwardly extending second generally vertical walls extending generally inwardly along the opposite edges of each said generally horizontal wall intermediate the downwardly extending rib and the respective first generally vertical wall, each upwardly extending second generally vertical wall having a projection thereon with the projections of each pair of upwardly extending second generally vertical walls extending away from each other in opposite directions.

12. A container in accordance with claim 11 wherein said downwardly extending rib of said pot is generally circular, said upstanding rib of said tray is generally circular, and the minimum diameter of said downwardly extending rib of said pot is greater than the maximum diameter of said upstanding rib of said tray.

13. A container in accordance with claim 11 wherein said upstanding rib of said tray extends upwardly from the bottom portion of said tray a first distance, said downwardly extending rib of said pot extends downwardly from the bottom portion of said pot a second distance, and said first distance is greater than said second distance.

14. A container in accordance with claim 11 wherein the bottom portion of said pot is characterized further to include at least one additional aperture therethrough.

15. A container in accordance with claim 11 characterized further to include:
at least one upwardly extending protuberance extending from the bottom portion of said tray and positioned adjacent an interruption in the rib of said tray;
at least one generally vertically aligned aperture in said pot sized and shaped to receive a corresponding protuberance of said tray therethrough; and
said at least one upwardly extending protuberance having detent means thereon for providing an interference fit with a corresponding at least one generally vertically aligned aperture in said pot so as to releasably connect said pot and said tray.

16. A container in accordance with claim 12 wherein the detent means on each said protuberance includes a portion of said protuberance intermediate the bottom portion of said tray and the outer end of said protuberance of reduced cross-sectional area relative to the cross-sectional area of said protuberance intermediate said portion of reduced cross-sectional area and the outer end of said protuberance; and wherein each said generally vertically aligned aperture is provided with a minimum cross-sectional area less than the cross-sectional area of each said protuberance intermediate said portion of reduced cross-sectional area and the outer end of said protuberance.

17. A container in accordance with claim 11 wherein each upwardly extending second generally vertical wall communicates between said downwardly extending rib and a respective first generally vertical wall.

18. A container in accordance with claim 17 wherein the projections on each pair of upwardly extending second generally vertical walls communicate between said downwardly extending rib and a respective first generally vertical wall.

19. A container in accordance with claim 17 wherein an opening is provided in said pot defined by each upwardly extending second generally vertical wall, the bottom portion of said pot, the downwardly extending rib of said pot, and the corresponding first generally vertical wall.

20. A container in accordance with claim 1 or claim 11 wherein said pot and said tray are formed of a moldable thermoplastic material.

21. A container in accordance with claim 20 wherein said moldable thermoplastic material is a moldable alpha olefin polymer.

22. A container in accordance with claim 21 wherein said moldable alpha olefin polymer is polypropylene.

* * * * *